March 19, 1968   J. L. BJELLAND   3,373,644
MAGAZINE FOR DISPENSING PHOTOGRAPHIC FILM
Filed Oct. 29, 1965   13 Sheets-Sheet 1

INVENTOR
JOHN L. BJELLAND
BY
Morgan, Finnegan, Durham & Pine
ATTORNEYS

March 19, 1968   J. L. BJELLAND   3,373,644
MAGAZINE FOR DISPENSING PHOTOGRAPHIC FILM
Filed Oct. 29, 1965   13 Sheets-Sheet 2

INVENTOR
JOHN L. BJELLAND
BY
Morgan, Finnegan, Durham & Pine
ATTORNEYS

March 19, 1968  J. L. BJELLAND  3,373,644
MAGAZINE FOR DISPENSING PHOTOGRAPHIC FILM
Filed Oct. 29, 1965  13 Sheets-Sheet 4

INVENTOR
JOHN L. BJELLAND
BY Morgan, Finnegan
Durham + Pine
ATTORNEYS

March 19, 1968 J. L. BJELLAND 3,373,644
MAGAZINE FOR DISPENSING PHOTOGRAPHIC FILM
Filed Oct. 29, 1965 13 Sheets-Sheet 5
Fig. 5.
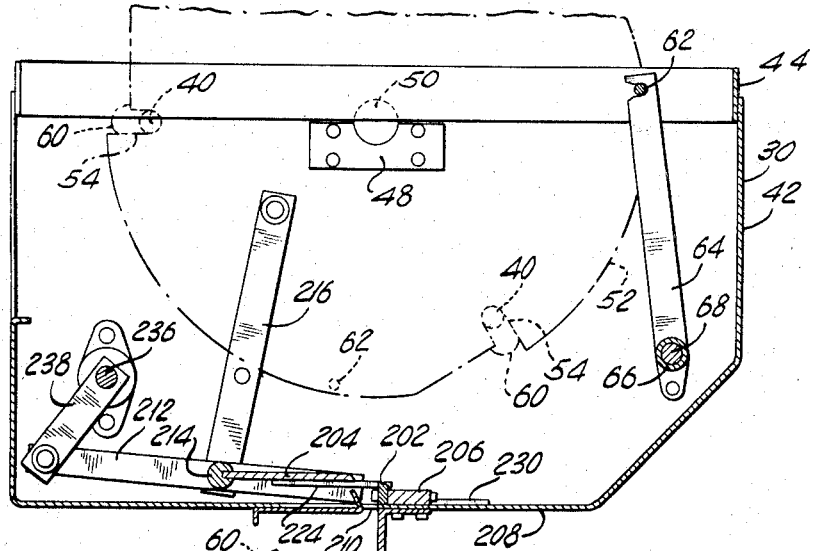
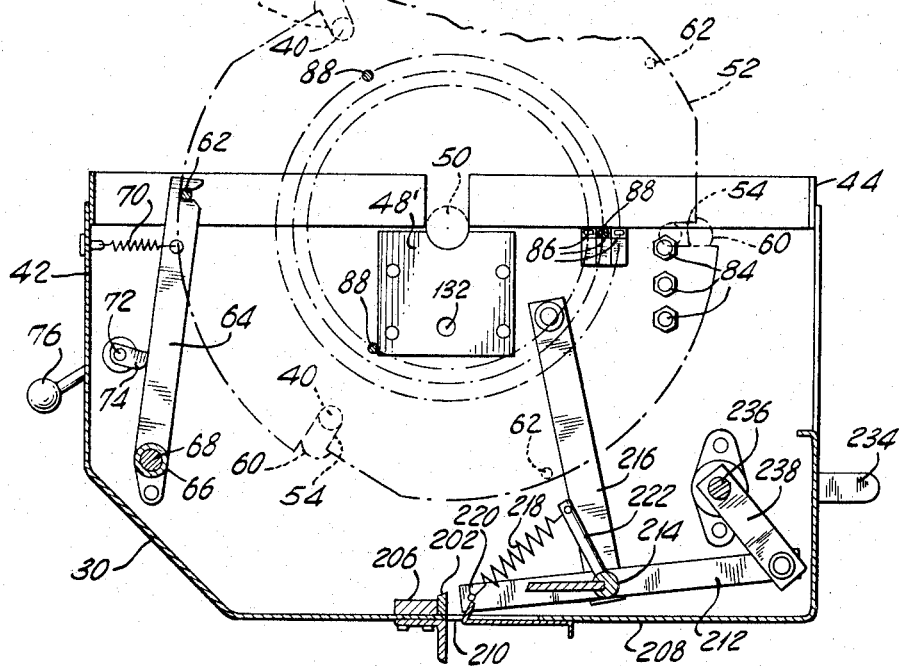
Fig. 6.
INVENTOR
JOHN L. BJELLAND
BY Morgan Finnegan, Durham & Pine.
ATTORNEYS

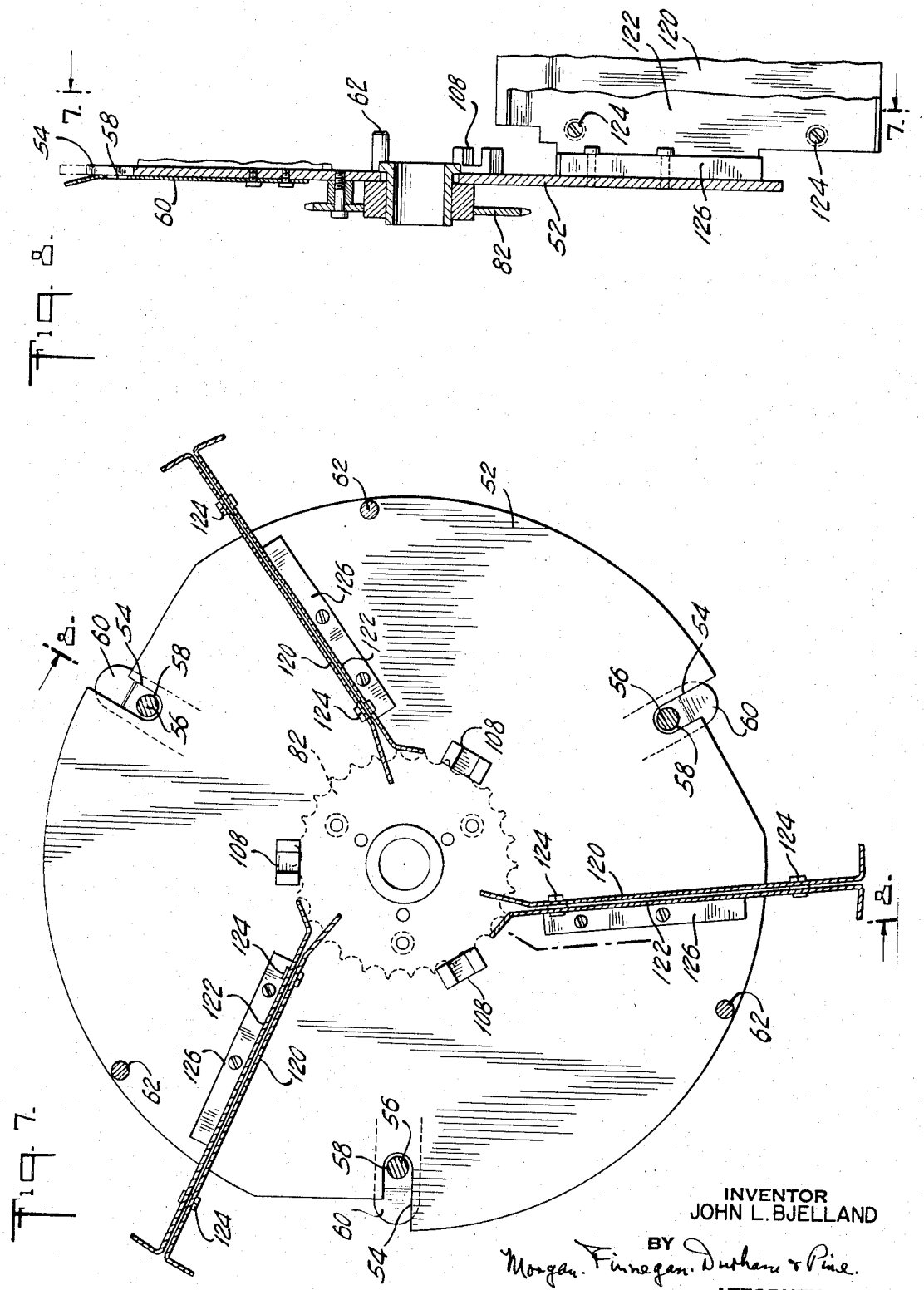

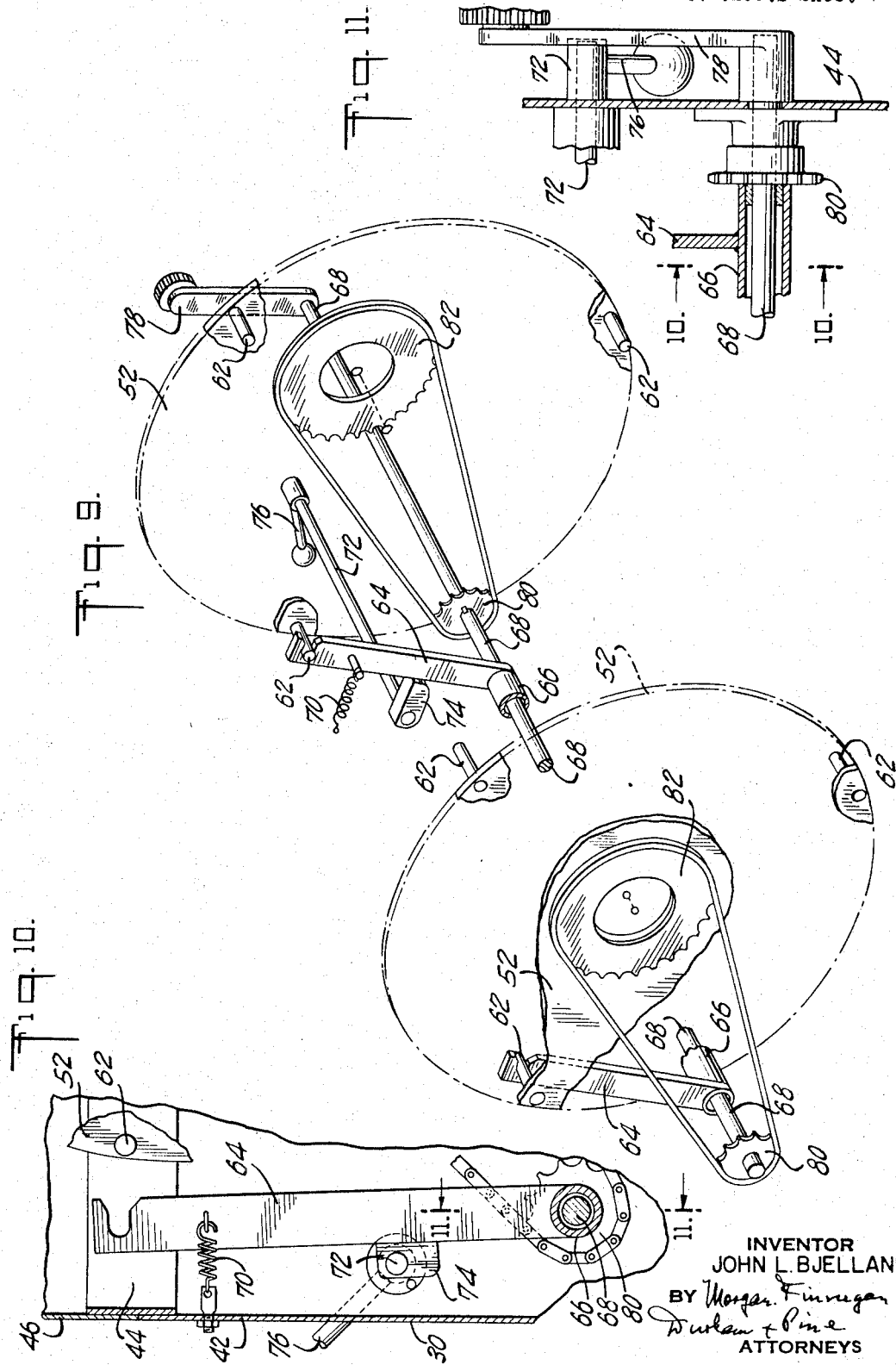

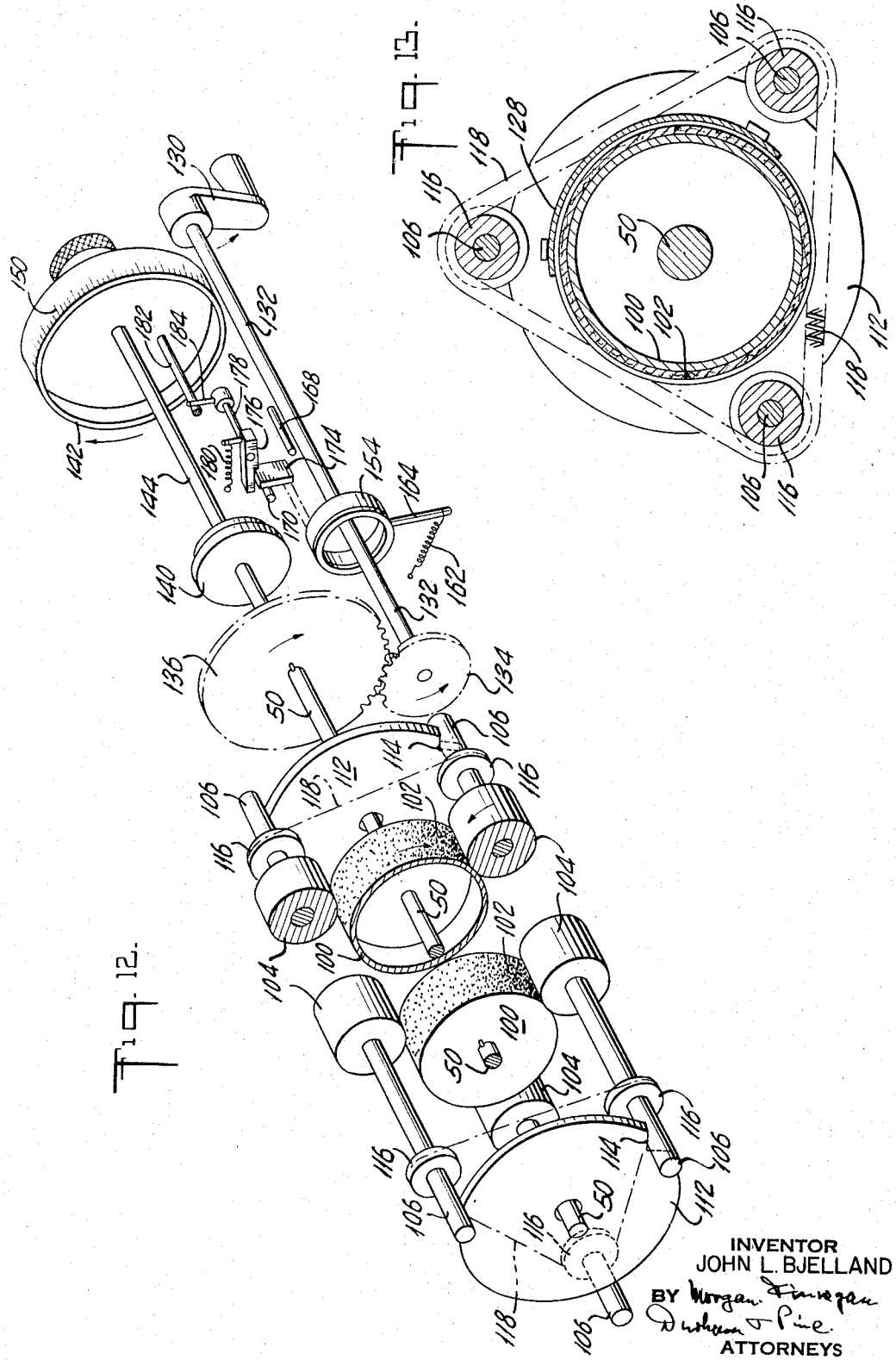

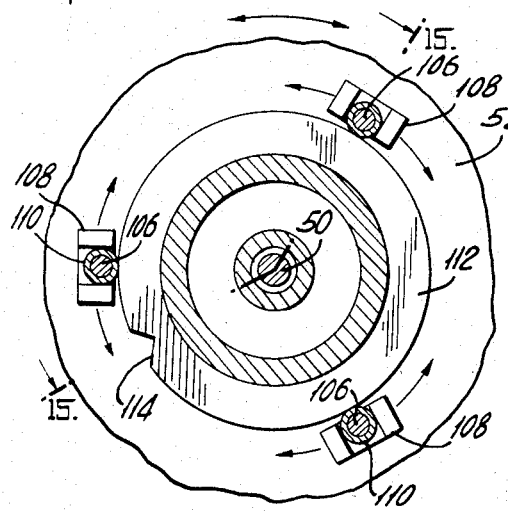
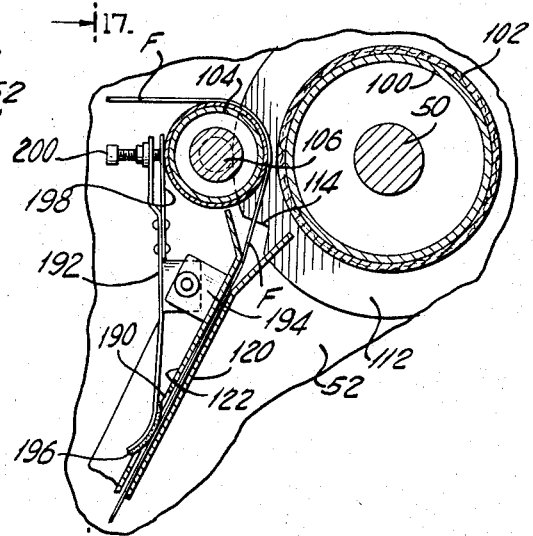
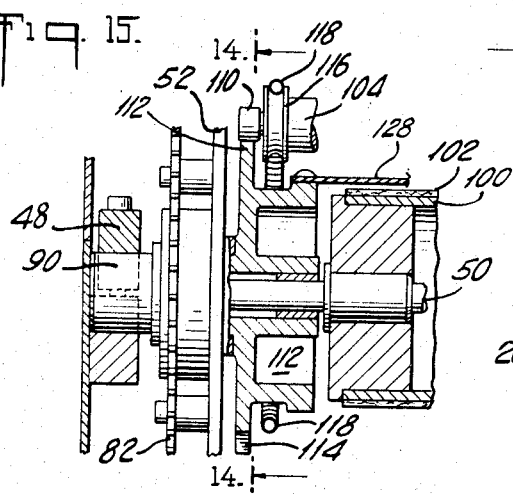
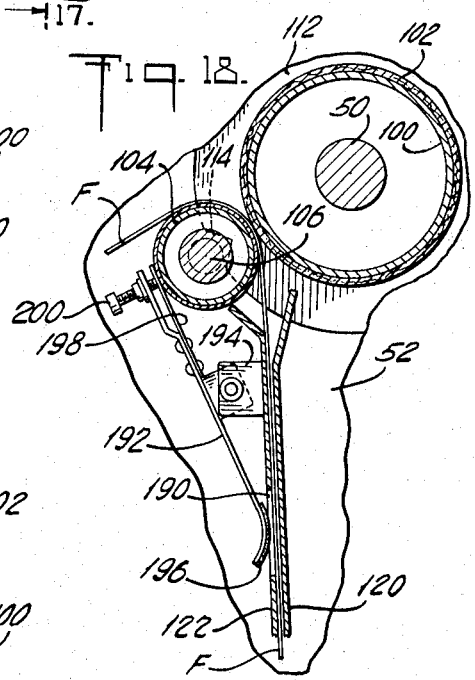
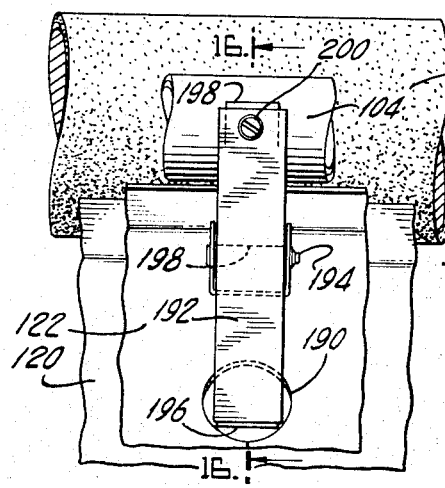

March 19, 1968      J. L. BJELLAND      3,373,644
MAGAZINE FOR DISPENSING PHOTOGRAPHIC FILM
Filed Oct. 29, 1965      13 Sheets-Sheet 10
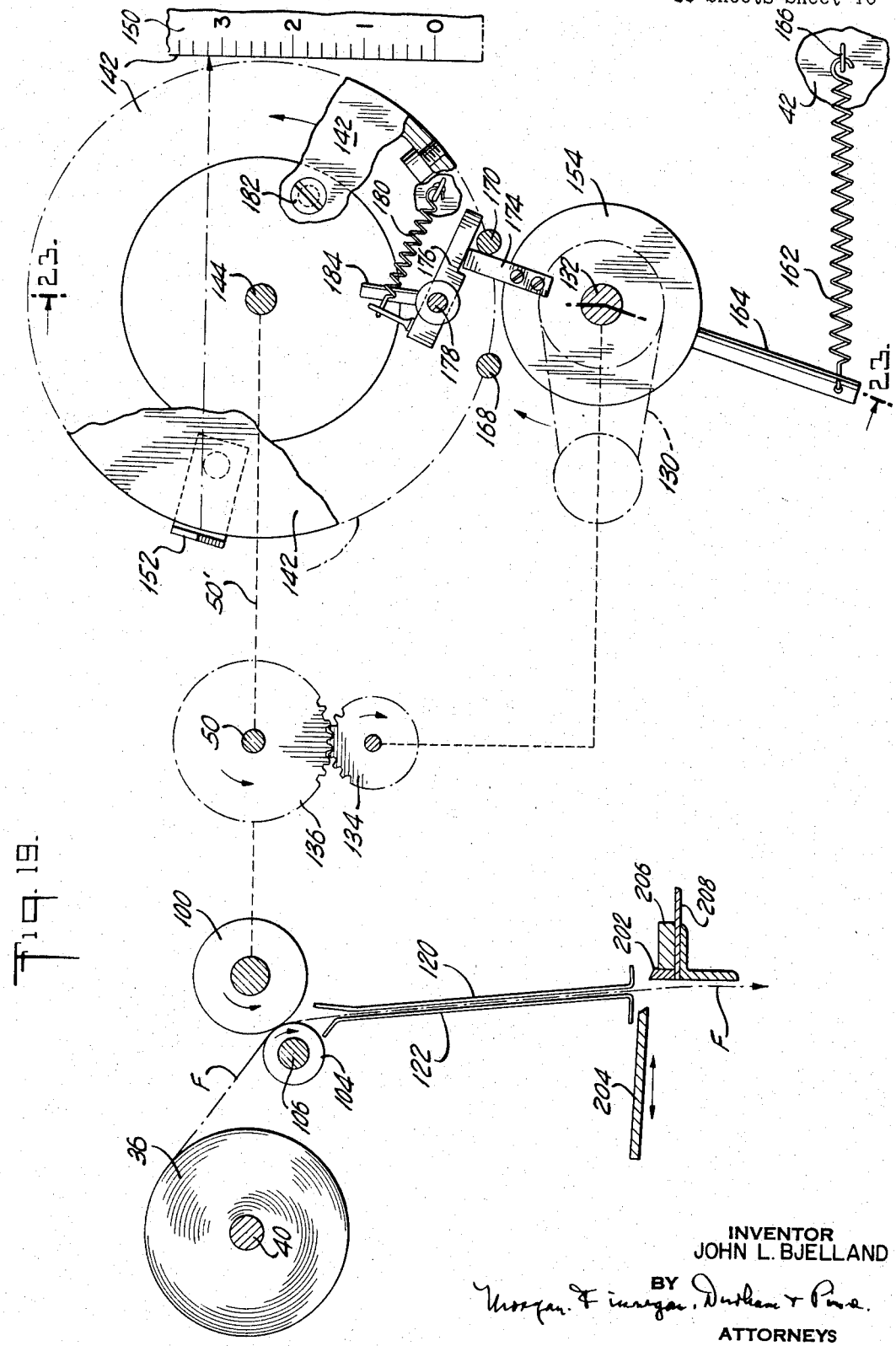
INVENTOR
JOHN L. BJELLAND
BY
ATTORNEYS March 19, 1968  J. L. BJELLAND  3,373,644
MAGAZINE FOR DISPENSING PHOTOGRAPHIC FILM
Filed Oct. 29, 1965  13 Sheets-Sheet 11

INVENTOR
JOHN L. BJELLAND
BY Morgan, Finnegan,
Durham + Pine.
ATTORNEYS

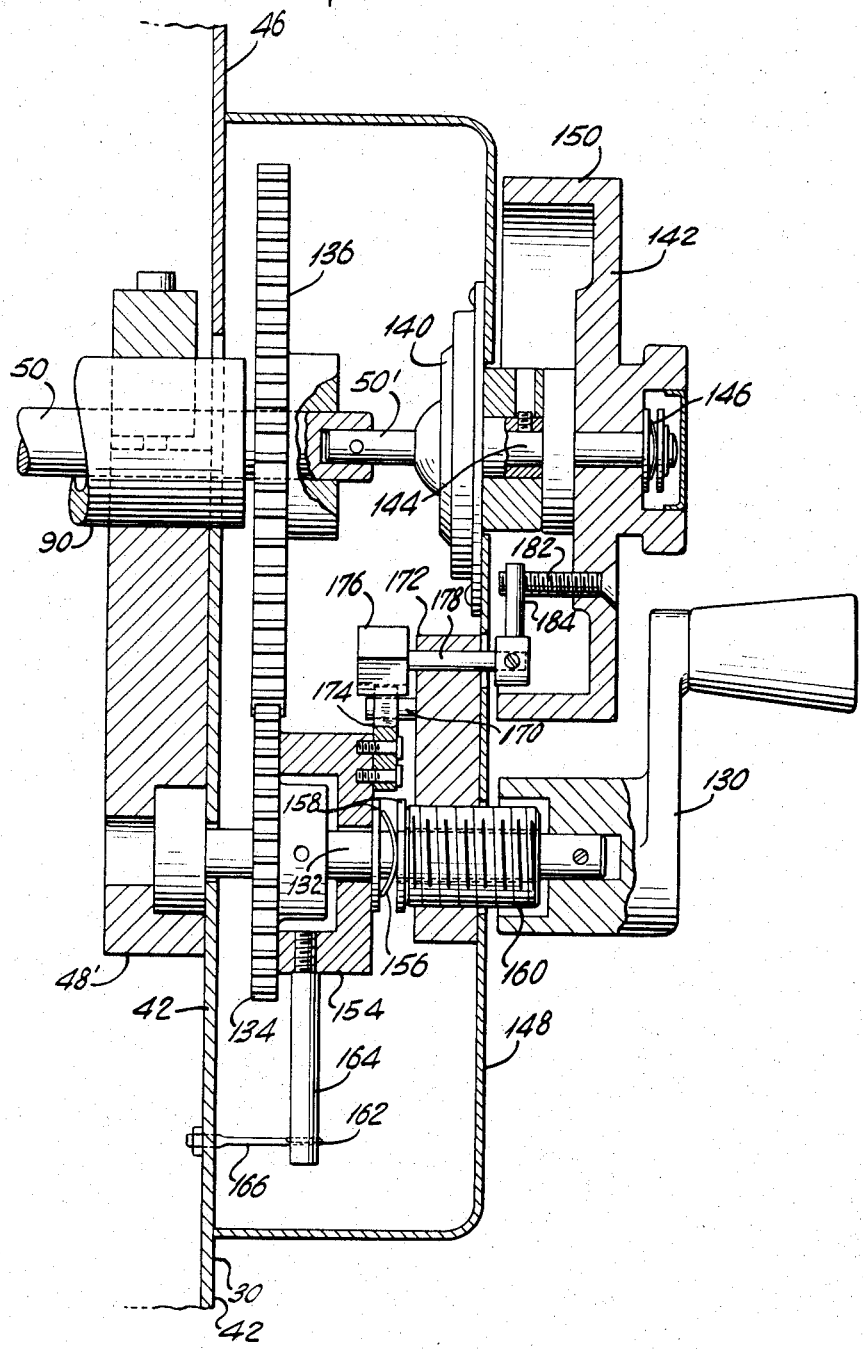

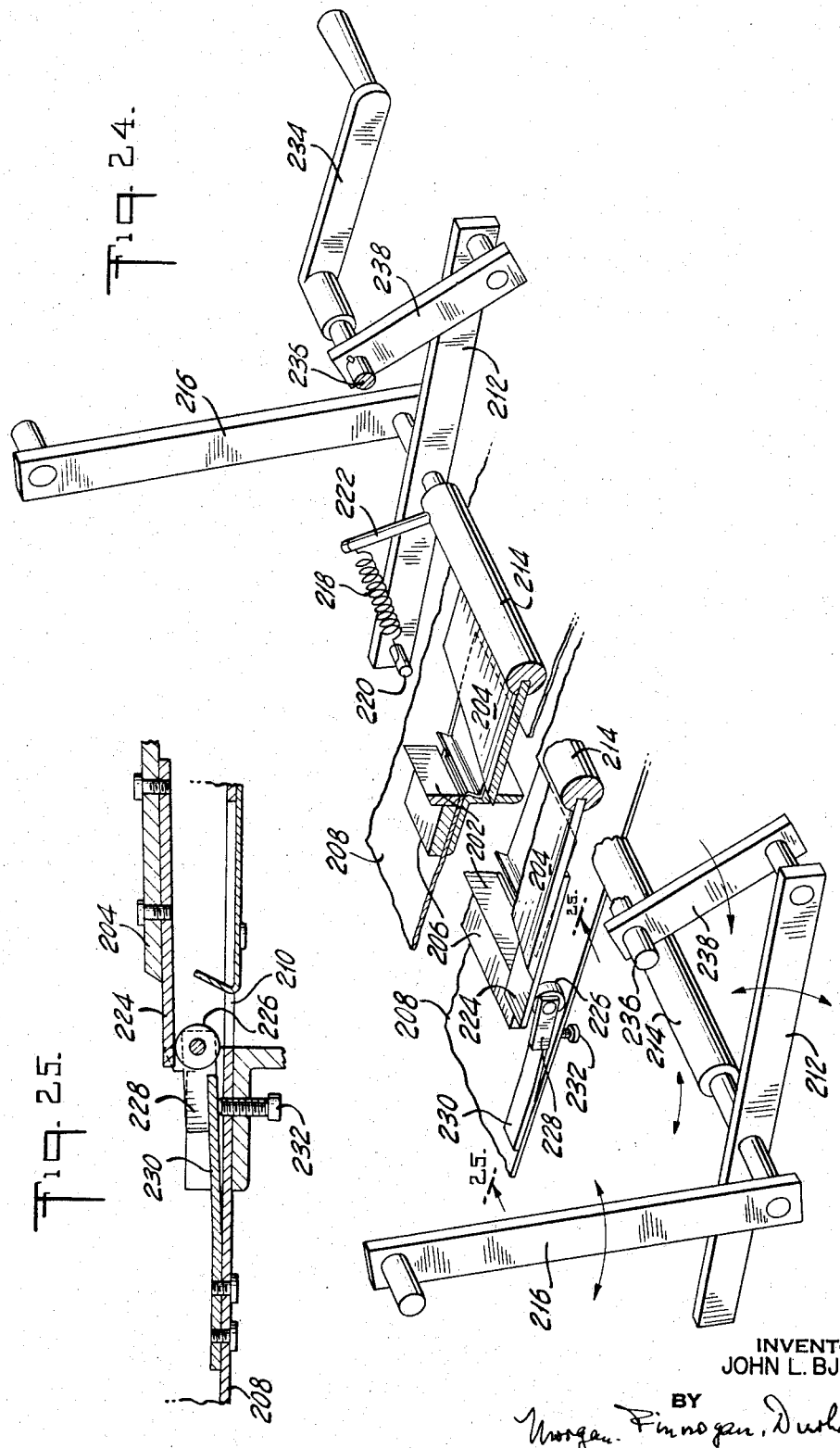

United States Patent Office 3,373,644
Patented Mar. 19, 1968

3,373,644
MAGAZINE FOR DISPENSING
PHOTOGRAPHIC FILM
John L. Bjelland, Glen Head, N.Y., assignor to Powers
Chemco, Inc., Glen Cove, N.Y., a corporation of New
York
Filed Oct. 29, 1965, Ser. No. 505,645
7 Claims. (Cl. 83—650)

ABSTRACT OF THE DISCLOSURE

The invention provides a film dispening magazine for dispensing photographic film in variable lengths from a selected one of a plurality of rolls of film. The magazine may be used by itself or as a part of a photomechanical camera. External control means are provided for the selection of one of the rolls, for feeding the film from the selected roll and for severing the desired length of film.

This invention relates to an improved film dispensing magazine for selectively dispensing photographic film from different rolls and for cutting off accurately measured lengths of photographic film in the dark room or when the magazine is mounted on the upper portion of a photomechanical camera.

Objects and advantages of the invention will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

Of the drawings:

FIGURE 5 is a fragmentary vertical sectional view taken on the line 5—5 of FIGURES 3 and 4;

FIGURE 6 is a fragmentary sectional view taken on the line 6—6 of FIGURES 3 and 4;

FIGURE 7 is a detailed sectional view taken on the line 7—7 of FIGURES 3 and 8;

FIGURE 8 is a sectional view taken on the line 8—8 of FIGURE 7;

FIGURE 9 is an exploded schematic diagram, with certain parts broken away, of the mechanism for holding a plurality of rolls of film, for selectively moving one or another of the rolls into feeding position and for indexing the rolls so that the fi'm is in proper film feeding position;

FIGURE 10 is a fragmentary detailed sectional view of the locking mechanism in released position taken on the line 10—10 of FIGURE 11;

FIGURE 11 is a fragmentary detailed vertical section taken on the line 11—11 of FIGURE 10;

FIGURE 12 is an exploded schematic view of the film feeding and metering mechanism for selectively feeding film from one or another of a plurality of rolls of film;

FIGURE 13 is a fragmentary sectional view taken on the line 13—13 of FIGURE 3 and showing the relation of the three sets of film feeding rollers to the central driving roller;

FIGURE 14 is a fragmentary detailed sectional view taken on the line 14—14 of FIGURE 15 and showing the bearing mountings at one end of the film feeding roller shafts with certain associated parts;

FIGURE 15 is a fragmentary detailed sectional view taken on the line 15—15 of FIGURE 14;

FIGURE 16 is a fragmentary detailed sectional view taken on the line 16—16 of FIGURE 17 and showing the film ready to be fed through a feeding throat and lightly clamped within the throat;

FIGURE 17 is a detailed fragmentary side elevation looking from the line 17—17 in FIGURE 16 and showing the film clamping means;

FIGURE 18 is a view similar to that in FIGURE 16 but with the rollers in film feeding position and the film holding clamp released;

FIGURE 19 is a composite schematic view showing various parts of the film feeding and metering mechanism and the cut off knife;

FIGURE 23 is a fragmentary detailed sectional view of a portion of the film feeding means and measuring dial as taken on the line 23—23 of FIGURES 4 and 19;

FIGURE 24 is a schematic view showing the film cutting mechanism and actuating means therefor; and FIGURE 25 is a detailed sectional view of the knife mechanism taken on the line 25—25 of FIGURE 24.

Figure 1:
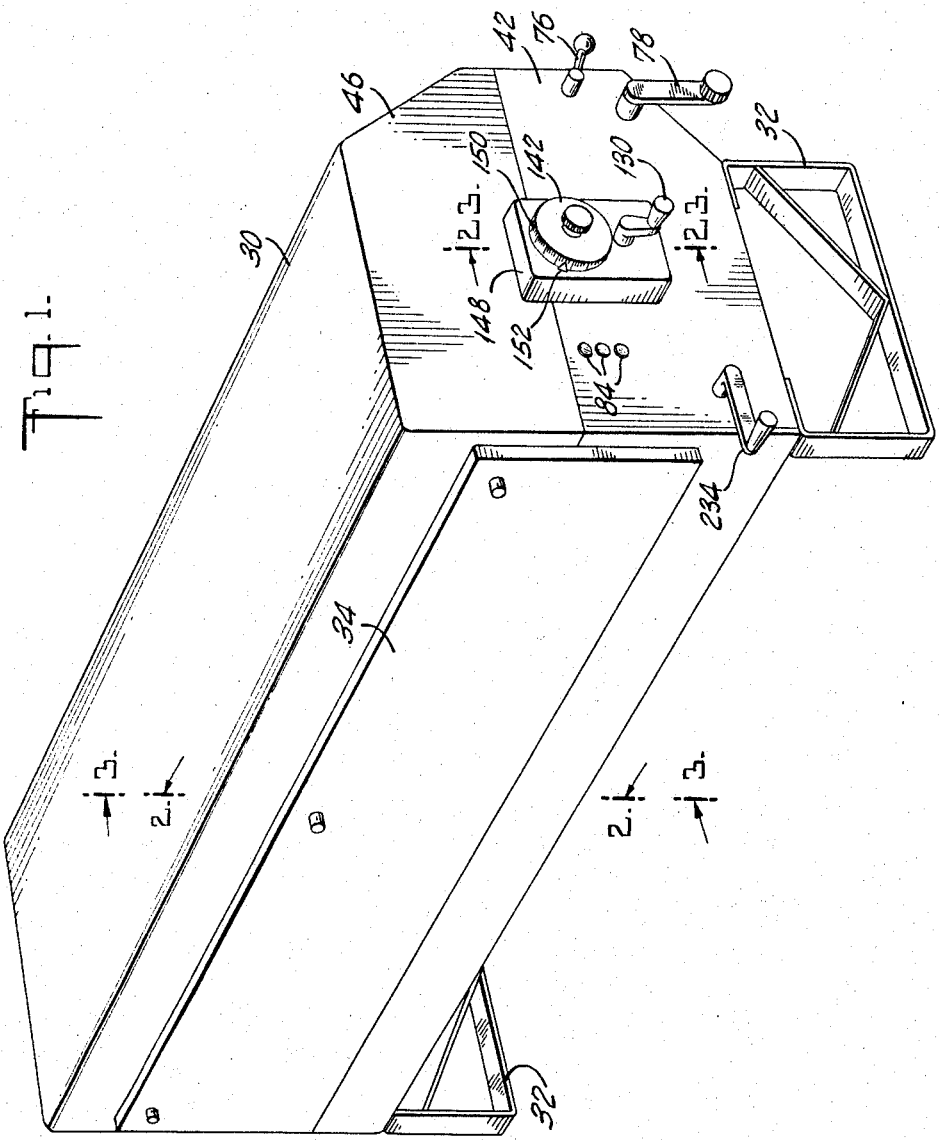
FIGURE 1 is an over-all perspective view of the present preferred and illustrative embodiment of film dispenser in accordance with the present invention.

The present invention provides an improved film dispensing magazine for selectively dispensing and cutting off film in measured lengths from any one of a plurality of supply rolls, which magazine is adapted to be used in a dark room or as part of a photomechanical camera, such as is used in photoengraving. The magazines of the present invention are exceedingly compact compared with those of the prior art, dispense varying lengths of film with greater precision than has heretofore been the case, and eliminate erratic feeding which has some times occurred when long lengths of film were fed from prior magazines.

Film feeding magazines for selectively feeding film from any one of several supply rolls are disclosed in the prior patents to Anander No. 2,836,373, Flynn and Schutt No. 2,949,248, and in the copending application of Schutt, Flynn and Bjelland Ser. No. 340,034, filed Jan. 24, 1964, and now U.S. Patent No. 3,256,794 issued June 21, 1966, but each of these magazines has specific disadvantages which are overcome by the magazine of the present invention.

The magazines of Patents Nos. 2,836,373 and 2,949,- 248 are relatively bulky and utilize different feeding rollers for feeding the film from each of the supply rolls, thereby giving rise to variations in the length of film fed unless all of the feeding rollers are very accurately made. Additionally, the film fed from any one of the several different rolls rubs against one or two films from the other supply rolls, often creates feeding problems due to the static electricity generated by the relative movement of the film with respect to the other film or films, and thereby causes the films to be adhered together, sometimes even presenting feeding of the film and in severe cases causing the film from the roll in use to become jammed.

Many of the difficulties were avoided in the improved film magazine disclosed in the Schutt, Flynn and Bjelland application, but at the expense of an increase in the bulk of the magazine which rendered the magazine unsuitable for use in a darkroom although well suited for use as a film supply magazine for a photomechanical camera. This earlier magazine also used different pairs of feed rollers for each different roll of film so that accuracy in the manufacture of these multiple pairs of feed rolls was required, as well as an elaborate and relatively expensive driving arrangement for driving a selected pair of rollers from a single actuating crank.

The present invention has for its object the provision of an exceedingly compact magazine for dispensing varying accurately measured lengths of photographic film from one or another of a plurality of rolls of film such as are used in photoengraving or other photomechanical reproduction. Such film may be of varying widths or may be provided with emulsions of varying characteristics.

A further object of the invention is the provision of such a film dispensing magazine which is adapted for use in the darkroom or which may alternatively be mounted on the upper portion of a photomechanical camera and in that position is adapted to feed film into the exposure area of the camera.

Referring now in detail to the present preferred and illustrative embodiment of the invention as shown in the accompanying drawings, the film dispensing magazine is shown as especially adapted for use on a table or other support in a darkroom, but by removal of the supporting legs the same structure may be used at the top of a photomechanical camera for feeding photographic film directly to the exposure area of the camera.

As shown, the film feeding magazine comprises a light-tight housing 30 having supporting legs 32 at either end thereof, and provided with a removable access panel 34 which may be removed for loading and unloading film rolls supported on the interior of the magazine. All of the control members for the magazine are mounted exteriorly of the housing and at one end thereof.

Within the housing 30 are provided rotatable means for rotatably supporting a plurality, preferably three, rolls of photographic film which film may be supplied in rolls of various widths, even as large as 24" or more in width or with different emulsions. As is customary, the film 36 is wound on cores which are provided at their ends with flanges 38 through each of which passes a supporting shaft 40.

The housing is preferably made in two parts which may be separated along a horizontal line; the lower portion 42 is provided at its upper edge with an inner band 44 extending above the edge of the lower half so as to locate the upper portion 46 of the housing and form a light-tight seal with the lower edges of the upper half.

On the end walls of the lower half of the housing and on the interior thereof are provided bearing blocks 48, 48' which receive the hubs 90 on the inner ends of which are mounted supporting discs 52, these supporting discs being provided with alined radial notches 54 to receive the film roll shafts 40. For holding the shafts 40 against axial and radial movement, the ends of the shafts 40 are formed with a reduced diameter portion 56, and this smaller portion is adapted to enter a hole 58 formed in the leaf springs 60 riveted to the disc 52 at each of the slots 54 and on the exterior face of each of the discs 52. When the shafts are positioned in the slot 54 the reduced end portion 56 enters the hole 58 and is thereby removably held in its fixed position with respect to the discs 52.

For releasably holding the discs 52 and the supported rolls of film in a selected position, lugs 62 equidistant from each other are mounted on the interior faces of the discs 52 and near the periphery thereof. Lugs 62 are adapted to be engaged by the slotted end of arms 64 pivotally mounted by tube 66 which is rotatably mounted on shaft 68 extending from one end of the magazine to the other, the two arms 64 both being secured to the opposite ends of the tube 66 so that they pivotally move in unison. Arms 64 are urged out of locking position by means of a tension spring 70 connected between one of the arms and an exterior wall of the lower part 42 of the housing, and externally actuated means are provided for moving the latching arms 64 into locking position and comprise a shaft 72 journaled in an end wall of the housing provided on its inner end with a cam member 74 to engage one of the arms 64 at a point intermediate the ends of the arm. Externally of the housing shaft 72 is provided with a handle 76 by which the shaft and cam 74 may be moved into and out of latching position.

For rotating the discs 52 to bring one or another of the film rolls 36 into film feeding position, means are provided for rotating discs 52 by means external of the housing 30. The horizontally extending shaft 68, journaled in bearings mounted on the end walls of the lower housing 44 is provided with an external crank handle 78 by which the shaft 68 is rotated in either direction. Shaft 68 near both of its ends is provided with a sprocket 80 and on the outer faces of the discs 52 there are provided larger sprockets 82 each of the sprockets 82 being fastened to its adjacent disc 52. A chain connects each of the sprockets 82 with its respective sprocket 80 so that rotation of the shaft 68 by the turning of crank 78 causes the discs 52 and the supported rolls of film 36 to be moved about shaft 50 once the latching arms 64 have been disengaged from the lugs 62.

In order that the operator may know which of the three film rolls 36 is in film feeding position three index lamps 84 are mounted on the end wall of housing 44 so that they are externally visible but are shielded on the interior of the housing so as to prevent fogging of the light-sensitive photographic film. The index lights 84 are selectively energized by current supplied through one or another of the three micro switches 86 mounted on the interior of the end wall of housing 42, and one or another of the micro switches 86 is closed by means of one or another of the lugs 88 projecting from the adjacent face of disc 52, the three lugs 88 being positioned at different distances from the shaft 50, and the lugs 88 being spaced 120° apart.

Each disc 52 is journalled for rotation about the shaft 50 by means of a stationary sleeve 90 which is held securely in the bracket 48 or 48' attached to the inner face of the housing end wall at the upper edge of the lower housing 42.

For feeding film from a selected one of the film rolls 36, there is provided a central feeding roller 100 surrounding shaft 50 and fixed thereto, the exterior of roller 100 being provided with a friction facing such as a thin layer of rubber 102. Surrounding roll 100 are three pressure rolls 104 spaced 120° apart also provided with a resilient covering such as rubber, these rollers 104 extending parallel to shaft 50, two of the rollers 104 being spaced from the roller 100 at all times, while the third roller 104 is pressed towards the roller 100 when the corresponding film roll 36 has been indexed into feeding position by rotation of the indexing handle 78.

Rollers 104 are rotatably mounted by their respective shafts 106 which have limited radial movement toward and away from shaft 50, but are held in fixed circumferential positions with respect to discs 52 by means of slotted bearing blocks 108 mounted on the inner face of disc 52 and are adapted to receive shaft ends 106 and journals 110.

Supported on shaft 50 and adjacent the inner faces of discs 52 are stationary cams 112 which are held against rotation by being affixed to one or the other of sleeves 90. Cam discs 112 are each provided with a notch 114 which is sufficiently large to allow the shaft 106 for one of the rollers 104 to be moved radially towards shaft 50 into pressure position for feeding film from the selected film roll 36.

For resiliently urging the rollers 104 towards the roller 100, and for moving one of the rollers 104 into pressure applying position, each of the shafts 106 is provided near its ends and near the inner faces of cams 112 with grooved pulleys 116, the pulleys 116 at each end of the rollers 104 being encircled by an endless coiled tension spring 118, sufficient tension being exerted by the spring to maintain the pulleys 116 and shafts 106 in the position shown in FIGURE 13 in which figure the shaft 106 at the lower lefthand portion of the figure is resting in a notch 114 at each end of the shaft.

Figure 2:
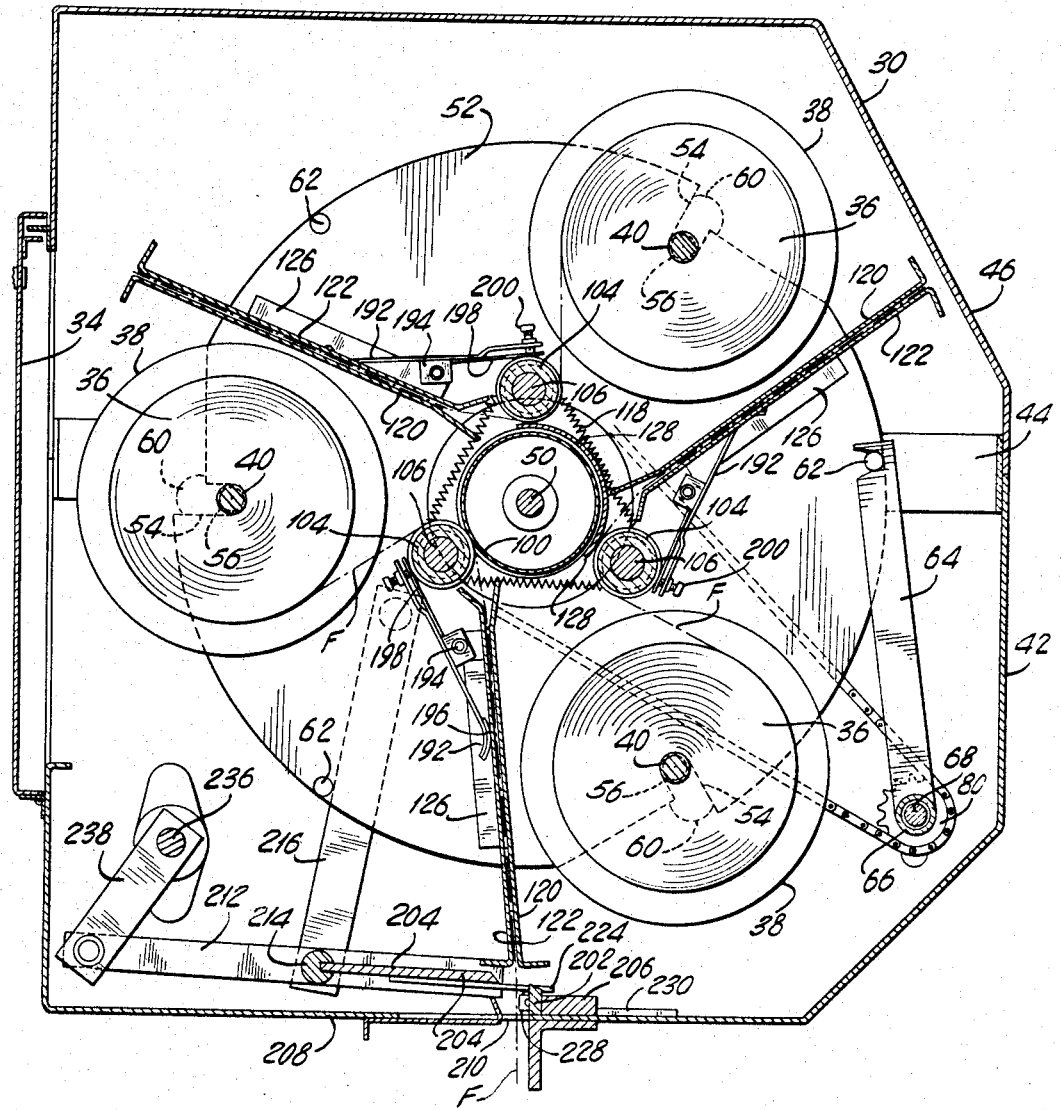
FIGURE 2 is a cross sectional view taken on the line 2—2 of FIGURES 1, 3 and 4.
Figure 3:
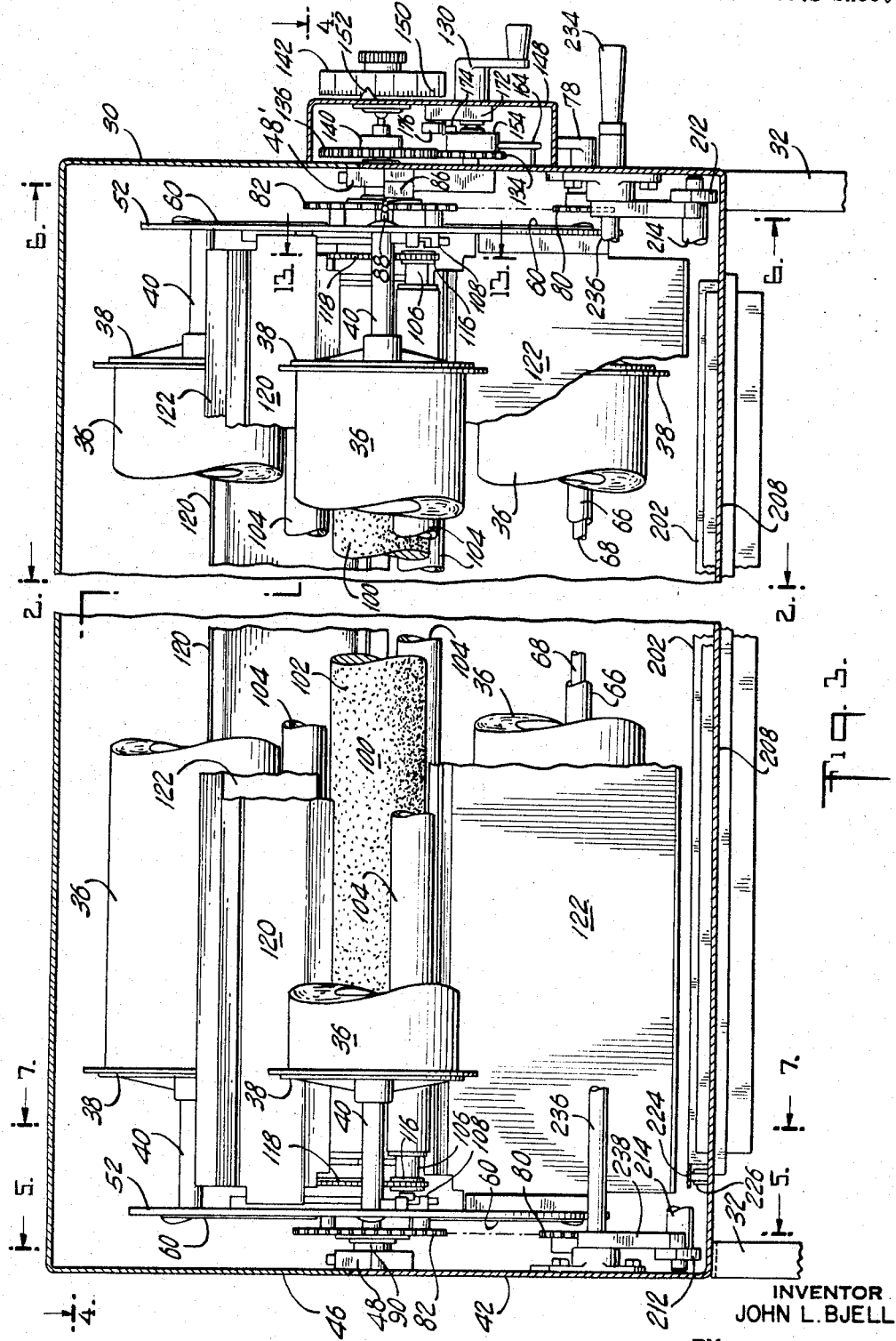
FIGURE 3 is a vertical sectional view taken on the line 3—3 of FIGURE 1.
Figure 4:
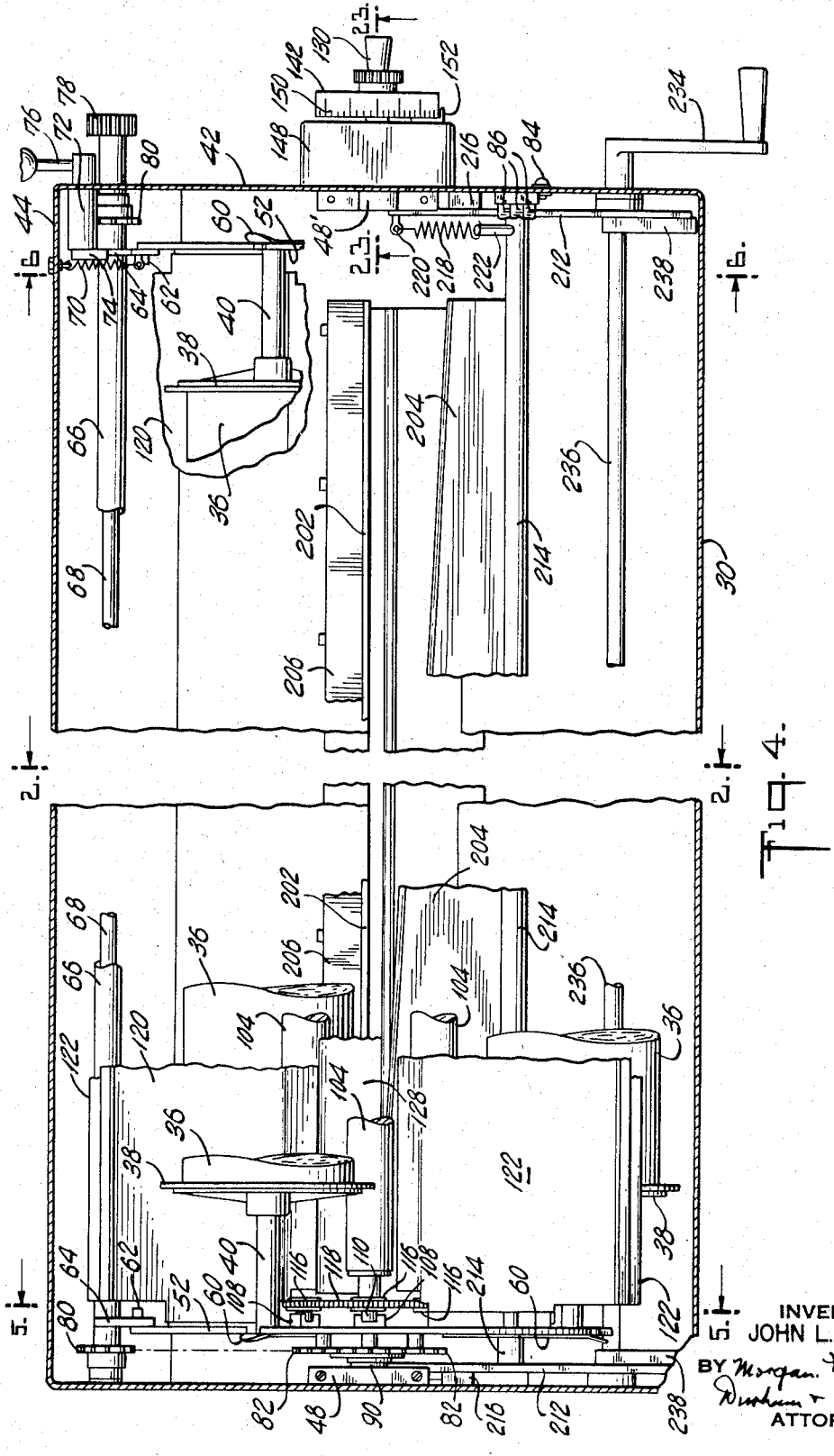
FIGURE 4 is a horizontal sectional view taken on the line 4—4 of FIGURE 3.

As shown in FIGURE 2 and schematically in FIGURE 19, the film F is fed from the roll by pressure exerted between rollers 100 and 104 and towards the knife used to sever the film and the delivery slot on the underside of the magazine housing 30.

For guiding the film from the bite of the rollers 100 and 104 to the knife and delivery slot there are provided substantially radial throat members each comprising a pair of metal plates 120, 122 which are slightly spaced from each other and held together at their ends by bolts 124, a washer being provided between the plates 120 and 122 to maintain the spacing of the plates and allow sufficient clearance for smooth passage of the film F through the throat.

Each end plate 122 is provided with a turned-over edge 126 by which the throats are anchored between the discs 52, one throat being provided between each pair of film rolls 36, the throats being similarly spaced with respect to their respective film feeding roll 36.

Surrounding a circumferential half of the roller 100 is a shield 128 which is securely held in position by being mounted on the cam plates 112 on the side of roller 100 away from the notches 114. This cylindrical shield 128 serves to avoid the possibility of the film rubbing against the surface of the film driving roller 100.

Means are provided for externally actuating roller 100 to feed varied measured lengths of film from the selected roll 36, this being the roll 36 at the lefthand side of FIGURE 2. For feeding the film there is provided a crank 130 mounted on shaft 132 journaled in the exterior wall of lower housing 42. Near its inner end shaft 132 is provided with a pinion 134 meshing with a gear 136 which is fast on shaft 50 so that rotation of handle 130 drives shaft 132 to drive shaft 50 and thereby feed film from the lefthand roll as shown in FIGURE 2. As shaft 50 rotates its motion is transmitted through a gear reduction unit 140 to drive the metering drum 142 which is frictionally held on the end of driven shaft 144 by means of the spring washer 146, gear reducing unit 140 being mounted on the metering housing 148 on the end wall of the lower main housing 42. The outside cylinder face 150 of the metering dial 142 is graduated to show the length of film being dispensed, the graduations cooperating with an index pointer 152 fixed to metering housing 148.

Means are also provided for retracting the film away from the cutting knife and delivery aperture so as to prevent interference between the leading edge of the film and the knife mechanism, as crank 78 is turned to bring a different roll of film into film-feeding position.

During normal feeding operation, film-feeding crank 130 is turned in a clockwise direction (FIGURE 1), and as this feeding movement takes place, resilient means are loaded which, after completion of the feeding movement and after the fed length of film has been severed, serve to retract the film a predetermined distance sufficient to clear the knife mechanism.

As embodied a cup-like member 154 is loosely journaled on shaft 132 and is pressed into frictional engagement with the outer face of pinion 134, pressure being exerted by means of a spring washer 156 positioned between thrust washers 158, and the pressure being adjustable by means of threaded sleeve 160 in which shaft 132 is journaled.

A tension spring 162 is held between an arm 164 projecting radially from cup 154 and an anchor 166 on the end wall of lower housing 42, spring 162 being loaded by clockwise rotation of crank 130 after which it is to be released for a slight amount of counter-clockwise rotation of shaft 132. Movement of the cup-like member 154 is limited by means of stop pins 168, 170 projecting from a block 172 mounted on the inside of box 148 and adapted to be engaged by arm 174 extending radially and upwardly from cup member 154.

Figure 20:
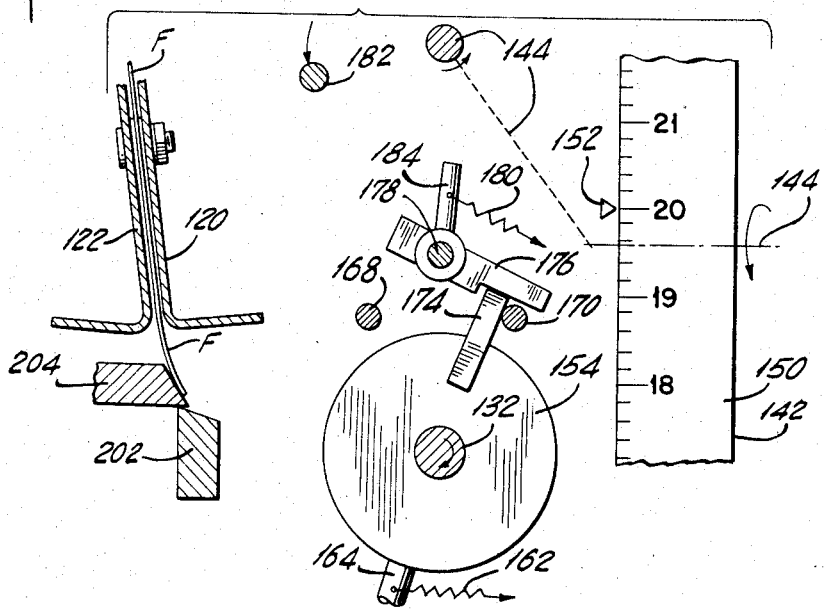
FIGURE 20 is a fragmentary schematic view showing the relation of certain of the parts after the required amount of film has been fed and cut off from the roll supply, and before the measuring dial has been reset.

Means are provided for temporarily latching cup member 154 in its spring loaded position (FIGURES 19 and 20), and for this purpose a latching detent 176 is pivotally mounted by shaft 178 journaled in block 172, detent 176 being urged into latching position by means of tension spring 180 and being provided with a cutaway portion to cooperate with the outer end of radial arm 174.

Figure 21:
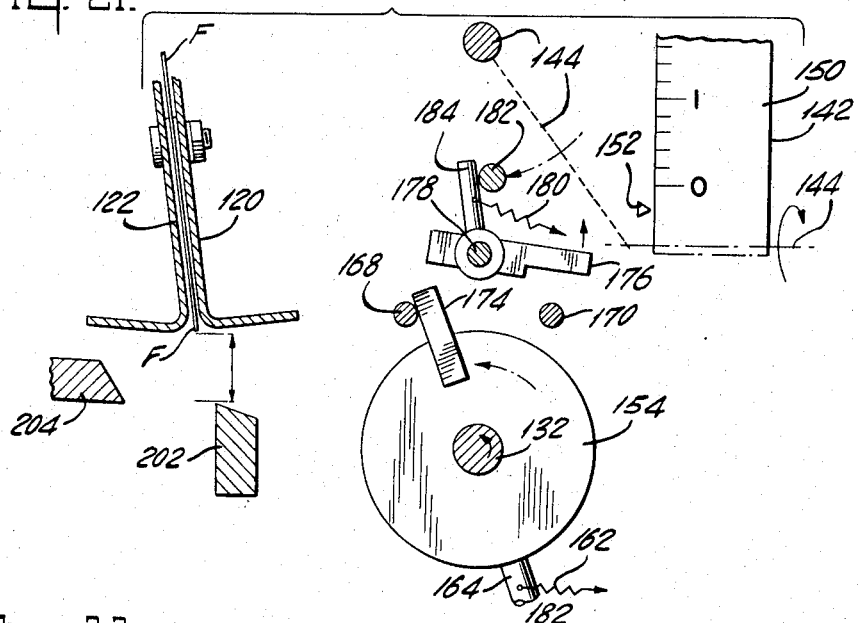
FIGURE 21 is a view similar to FIGURE 20 prior to the film feeding operation and with the end of the film retracted from the knife so that another roll of film may be brought into film feeding position if desired.
Figure 22:
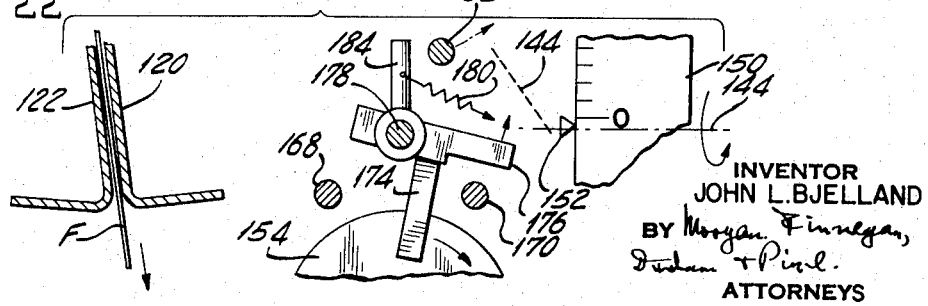
FIGURE 22 is a similar schematic view showing certain of the parts after feeding of the film has started and at the beginning of the measuring operation.

Means are also provided for unlatching the latch member 176 as the metering dial 150 is returned to its normal starting position (FIGURE 21). As the dial 150 is returned to zero and beyond, an inwardly projecting pin 182 carried by the dial member 142, 150 moves with it and is adapted to engage pin 184 fast to shaft 178. Movement of the dial 150 beyond the zero position swings latching detent 176 so as to release radial arm 174 thereby allowing spring 162 to rotate the cup member 154 in a counterclockwise direction (FIGURE 21) and this rotation imparted to shaft 132 causes the shaft 50 and central feed roller 100 to be moved in a direction opposite to the feeding direction, thereby retracting the film so that it is moved back away from the cut-off knife.

Means are provided cooperating with the film throats 120, 122 for holding the free end of the film in a relatively fixed position after it has been retracted and as the indexing crank 78 is turned to bring a different roll of film into film feeding position. For this purpose each of the plates 122 is provided with an aperture 190 located approximately centrally of the plate 122, and into this aperture projects one end of a lever 192, the lever being pivoted on a bracket 194 mounted on the plate 122. The end of lever 192 which is adapted to engage the surface of the film, is provided with a soft thin pad of felt or rubber 196, while the other end of the lever 192 is provided with an attached leaf spring 198 which is adjustably spaced from the end of the lever by means of a lock screw 200. The leaf spring 198 bears against the corresponding feed roll 104 and in the non-feeding position pad 196 is held again the film due to the rollers 104 being held out of contact with the central feed roll 100. As shown in FIGURE 2 the two right-hand rolls of film are in nonfeeding position while the left-hand roll of film is in feeding position with the friction pad 196 not being pressed against the film through aperture 190.

As mentioned earlier, knife means are provided for cutting off the desired length of film and these knife means are principally shown in FIGURES 2, 4, 5, 6 and schematically in FIGURES 19, 20, 21, 22, 24 and 25. As embodied the knife means are shear cutting means comprising a lower fixed blade 202 and a movable blade 204. Blade 202 is fixed to a bar 206 mounted on the bottom wall 208 of the housing 30, 42 and extends parallel to the film and adjacent to the film delivery slot 210 formed in the bottom wall 208, the sharpened edge of the knife being straight and uppermost.

The horizontally movable cooperating shear blade 204 has a beveled edge which extends at an angle to the blade 202, the lower portion of the forward edge of blade 204 being the sharpened edge. Blade 204 is pivotally mounted inside arms 212 by means of shaft 214, and the knife and shaft 214 are vertically supported by means of arms 216 which are pivotally mounted in the end walls of the lower portion 42 of the housing, the blade supporting shaft 214 being freely journaled by its reduced ends which pass through the arms 212 and into suitable holes at the lower end of the arms 216.

Blade 204 is yieldably urged downwardly by means of a tension spring 218 connected between an anchor post 220 at the forward end of one arm 212 and a pin 222 extending radially from shaft 214. Downward movement of the shaft under influence of spring 218 is limited by means of a flat strap 224 extending forwardly of the blade at one end thereof and engageable with a roller 226 which is freely rotatable and is supported on a bracket 228 mounted on the lower wall 208 by means of a leaf spring 230 which is adjustable by screw 232 passing through the bottom wall. Shaft 214 is held by the arms 216 so that its center is somewhat above the upper edge of knife 202, and roller 226 has its axis substantially in line with the edge of blade 202.

Thus as the blade 204 is moved forwardly towards and into engagement with blade 202 the knife is gradually allowed to descend so that the blades 202 and 204 cooperate in shearing relationship to shear the film beginning at one edge thereof and continuing to the other edge.

Means are provided for centrally actuating the movable knife 204 and for this purpose a crank 234 is rotatably journaled by its shaft 236 in the end wall of lower housing 42. Shaft 236 extends the full width of the housing and at bottom its ends carry arms 238 fast on shaft 236, the lower ends of arms 238 being connected to their adjacent side arms 212.

Thus, as crank 234 is partially rotated in a counterclockwise direction, the knife 204 is moved forward into engagement with knife 202 to cut off the desired length of film which has been fed from the film roll 36.

The invention in its broader aspects is not limited to the specific mechanisms shown and described but departures may be made therefrom within the scope of the accompanying claims without departing from the principles of the invention and without sacrificing its chief advantages.

What is claimed is:

1. A roll-film dispensing magazine comprising a housing within which may be rotatably mounted a plurality of rolls of film, said rolls of film being mounted for rotational movement about a central shaft, parallel to the axes of said rolls, to bring a selected roll into film feeding position, a slot in said housing through which a length of selected film may be dispensed, a knife adjacent said slot to sever a length of film from the roll, means external to said housing for moving a selected roll into film feeding position, means external to said housing selectively operable on said selected roll and located centrally of said rolls for feeding the desired length of film from said selected roll, and means external to said housing for actuating said knife.

2. A roll-film dispensing magazine as claimed in claim 1, in which there is a central feed roller actuated by external means which roller cooperates with individual feed rollers, one for each roll of film, and means are provided for rendering inoperative the individual feed rollers except for the selected roll of film in feed position.

3. A roll-film dispensing magazine as claimed in claim 2, in which film feeding throats are provided for guiding film from each of the rolls of film.

4. A roll-film dispensing magazine as claimed in claim 3, in which means are provided for retracting the leading edge of the film away from the knife and delivery slot prior to rotational movement of the several rolls of film to bring another roll of film into film feeding position.

5. A roll-film dispensing magazine as claimed in claim 2, in which there is a metering dial driven as film is fed from the selected roll, and which may be reset to a zero position, resilient means driven actuation of the film feeding means, latching means for latching said resilient means in a spring loaded position, means for releasing said latching means on reverse movement of the metering dial to zero position, said resilient means when unlatched serving to drive the film feeding means in a reverse position to retract the leading edge of the film away from the knife and delivery slot.

6. A roll-film dispensing magazine comprising a housing within which may be rotatably mounted a plurality of rolls of film, a central shaft about which said rolls are rotatably mounted whereby a selected roll may be brought into film-feeding position, an external means for rotating the rolls about said central shaft, a feed roller rotatable on said central shaft, an external crank for rotating said feed roller, cooperating feed rollers, one for each roll of film, each of the films passing between the central feed roller and its respective feed roller, and means controlled by rotation of the film rolls about the central shaft for spacing the film feeding rollers from the central feed roller except for the film roll in selected feed position, and means holding the films other than the one in selected feed position against retrograde movement.

7. A roll-film dispensing magazine as claimed in claim 6 in which means are provided for reversely feeding the film prior to the time the rolls are rotated about the central shaft to bring a different selected roll of film into feeding position.

References Cited

UNITED STATES PATENTS

| | | | |
|---|---|---|---|
| 3,160,047 | 12/1964 | Malloy et al. | 83—650 X |
| 3,256,794 | 6/1966 | Schutt et al. | 95—31 |
| 3,298,265 | 1/1967 | Millican et al. | 83—650 X |

ANDREW R. JUHASZ, *Primary Examiner.*